Patented Dec. 13, 1949

2,491,302

UNITED STATES PATENT OFFICE 2,491,302

PROCESS OF BENEFICIATING CHERTY MINERALS

Harold J. Dunton, San Jose, Calif.

No Drawing. Application July 24, 1945,
Serial No. 606,882

6 Claims. (Cl. 23—182)

This invention relates to the beneficiating of chert and cherty minerals, and it has particular reference to the beneficiating of cherty limestones.

Chert (or hornstone) is an impure variety of flint occurring in large masses in rocks of the carboniferous system and also as disseminated grains, chiefly in limestone rocks. Chert is very difficult to grind. This is the reason why no commercial use of chert and cherty rocks has been possible hitherto, except those occasions in which slabs or blocks of the natural stone can be employed. Where the limestone itself was of a high degree of purity, hand picking on belts has been practiced to separate the $CaCO_3$ from large veins, nodules, or masses of chert irregularly dispersed within the stone; the chert picked out was rejected.

In view of this situation it is among the objects of the present invention to provide a method for converting chert into a high grade siliceous material that is useful for many commercial purposes; moreover to recover chert converted in this manner from cherty minerals of high chert content. And it is a particular object of the invention to provide a method for recovering high grade calcium oxide from cherty limestones while at the same time causing the chert lenses which appear embedded in such limestones to be transformed into a valuable commercial silica source.

This invention is based on the discovery that by a heat treatment with subsequent chilling or quenching the physical state of chert is changed from one of extreme hardness to one of such softness that the material can be easily ground to any degree of fineness required for commercial purposes, such as for making certain grades of glass, e. g. bottle glass, in the manufacture of refractories and ceramics, of stuccos or plasters consisting of asphaltic mixtures, of wall boards, shingles, in preparing certain grades of concrete (limited by its softness), and in many other uses. It has been found that for the purpose of effecting the transformation aimed at, the burning is to be performed to temperatures above 1000° C., advantageously around 1150° C. or even somewhat higher; chilling may be effected by contacting the hot material with a gaseous chilling agent or by treating it with, or immersing it in, water while still hot.

In applying that latter method to cherty limestones, in the calcination stage the calcium carbonate is converted into quicklime which is then hydrated and disintegrated into an extremely fine powder through the treatment with water, or will form a slurry if sufficient water is added. On the other hand, the silica in spite of being materially changed in its physical condition remains in practically the original condition as to size and shape. The calcium hydroxide can then easily be separated from the chert either by sizes or by density or in both ways. In this manner two commercially valuable products are enabled to be recovered from natural cherty limestones which are of little or no practical use in their original state.

It has been known for a long time to use calcination with subsequent hydration and mechanical separation for recovering high grade lime from calcareous minerals carrying accompanying substances of a different mineralogical nature, whether said foreign concomitants were used in themselves or rejected.

As early as in 1891 the suggestion was made in the U. S. Patent No. 453,753 to Baude to prepare pure lime for the manufacture of Portland cement from blue limestone, a formation known to geologists as the "Hudson River" or "Cincinnati" group, by burning the limestone as it is ordinarily done in the process of making quicklime, and placing the lumps of calcined limestone as they come from the kiln in wire baskets, immersing them in water, and then quickly removing them. On emptying out the lime upon a floor and allowing it to remain until it is slaked, only the pure lime will slaken, that is to say become hydrated, and thereby be caused to crumble, whereas the foreign matter and the impure lime—that is lime containing silica—will not slaken, but remain in lumps and can then be separated from the hard solid particles by sifting. A similar proposal is made in the British specification No. 1,110–1908 to Buendia in connection with the treatment of ores in general for the purpose of recovering pure quicklime on the one hand and enriched ore on the other, or with a view of purifying lime.

This principle of calcination with subsequent hydration and separation has later on repeatedly been used with slight modifications in the beneficiation of calcareous minerals, particularly argillaceous limestones. The present process, too, is based on that known principle. However, the fundamental change in the physical state of the chert which is a particular purpose of the present process can not be brought about but by essentially deviating from the calcination step as applied according to the prior art.

The evolution of carbon dioxide from $CaCO_3$ begins between 600° C. and 725° C. and continues up to 850° C. to 900° C. though when large masses are being burned for the production of quicklime the kilns are usually heated to 900° C. to 1200° C. (1652° F. to 2192° F.), the maximum temperature depending on that at which the impurities fuse and so cause the lime to become overburned (cf. Alfred B. Searle, Encyclopaedia of the Ceramic Industries, Ernst Benn Ltd., London, vol. II, 1930, page 257). Yet, to change the physical conditions of the chert, the cherty limestone must necessarily be burned to unusually high temperatures. Of course, also in the present process the temperatures are conditioned by the degree of fineness of the material to be treated and the duration of the calcining treatment; yet as a rule the required temperatures come near or even exceed the uppermost limit permissible in producing quicklime from purest calcareous rocks. Those temperatures do not cause combination between the $CaCO_3$ and silica or alumina during the calcination, and as a consequence thereof during the subsequent hydration, as would be the case in an argillaceous limestone; cherty limestones behave otherwise because in such limestones the silica is in close contact with $CaCO_3$ only at the interbedding faces between the separate layers of $SiO_2$ and $CaCO_3$. Furthermore, in cherty limestones both the $SiO_2$ and $CaCO_3$ are substantially free from Fe and Al. This is the reason why in cherty limestones even at higher burning temperatures than are usual in producing quicklime from high grade calcites, reactions between the lime and the silica and alumina, forming silicates and aluminates, which would interfere with the subsequent separation process do not occur but to a very limited extent.

Regarding this detail, attention is to be called to U. S. Patent No. 1,150,897 to Spencer, though the disclosure as a whole is not pertinent to the consideration in hand. This specification describes as an alternative a method of operation in which the calcination of calcareous zinc tailings is performed at a temperature high enough not only to produce quicklime from the calcareous gangue but to convert it into an "overburnt" form that reacts but very slowly or not at all with water (page 2, lines 48 to 53). In doing this, the overburnt calcareous gangue forms granules that can easily be separated from the zinc minerals. What is interesting here, is the temperature contemplated for such an overburning of the lime. In this respect, on page 2, the following is stated in lines 113 to 118:

"In the calcination, any temperature above 700° C. may be employed though it is desirable, and particularly in producing overburning, to work at a rather higher range, say for producing quicklime, around 950° C. and for overburning, around 1050° C." (1922° F.)

It is an indispensable requirement to success that the cherty limestone is calcined at unusually high temperatures which were bound to produce overburning when adopted in producing quicklime or in the treatment of argillaceous limestone.

It may be mentioned that in a prior patent, No. 2,006,939 to Breerwood, it has been proposed to apply the known principle of calcination-hydration-separation to manufacturing cement, particularly Portland cement, in which calcium silicates and calcium aluminates are the essential constituents, while starting with raw materials that contain all those constituents, but in unsuitable proportions. In this case it is obviously a necessity to use argillaceous limestones which contain the required amount of alumina (or an excess thereof) besides $CaCO_3$. However, to render this possible, the original principle had to be modified in a manner opposite to the modification necessary for making the original method applicable to the treatment of cherty limestones.

According to Breerwood the crushed product is calcined to a degree sufficient to obtain a substantially complete ignition loss, but without heating the rock for a sufficient length of time and at a temperature by which material reactions between the calcium and the silica and to some extent the alumina would be caused to take place during calcination, and which would particularly favor the occurring of such premature reactions in the course of the subsequent hydration. This condition is stated to be slightly critical, owing to the presence of combinable silica, which is made more reactive by the heating process. Therefore the step of calcination "should not be confused with the calcination of high grade limestones, for the purpose of producing caustic lime" (page 2, l. c., last paragraph and r. c., lines 1 to 5).

As to the hydration, this second step has to be effected according to Breerwood by stirring the batch in the presence of a great excess of water but only for a very short period of time. The mass is reported to be completely disintegrated and suspended within one to three minutes. Stirring the batch (e. g. in a wash mill) is likewise intended to limit the degree of premature reactions, particularly between the calcium and the silica (page 4, l. c., lines 64 to 74). After stirring, the coarse silica particles settle almost immediately, and the argillaceous compounds very quickly thereafter, usually within about 45 seconds, whereas the calcium hydrate formed remains suspended. The surplus of that precipitated constituent which is in excess is then discarded and the remainder returned to the other constituent (or to an untreated part of the original material), to keep the analysis of the final mixture within the required limits.

The hydraulic nature of silicates of calcium and to some extent also of calcium aluminates, which would result from a greater degree of calcination than desired, is reported to prevent disintegration partially or wholly when the rock is submerged. It is stated that this reaction may be so complete due to excessive heat treatment, that the rock will not disintegrate. It will be seen therefrom that the degree of separation is limited by the extent of these reactions. As the compounds formed by premature reactions are eliminated from the mixture as waste, it follows that controlling calcination conditions such that premature reactions are prevented from taking place is also essential in the economical employment of the process (page 2, r. c., lines 31 to 42). The required conditions are exemplified in the specification by the statement (cf. page 4, l. c., lines 17 to 24) that a rock of three-quarter inch ring size, when calcined at a temperature of 1800° F. for approximately one hour and 50 minutes will disintegrate within three minutes even without agitation after submergence in ten to fifteen volumes of water, with relatively little loss due to premature reactions.

It may be emphasized again that in order to change the physical state of the chert from one of extreme hardness that makes it difficult to grind to one of great softness, in the present process the cherty limestones have necessarily to be calcined at temperatures that are even higher than usual in the calcination of high grade limestones for the purpose of producing caustic lime. And this can be done, as has been set forth above in detail, because those temperatures when applied to cherty limestones do not cause combination of the lime with the silica and with the alumina, seeing that in cherty limestones the silica is in close contact with $CaCO_3$ only at the interbedding faces between separate layers, and the said limestones are substantially free from alumina. As a consequence thereof, even in effecting the calcination at temperatures that are higher than the maximum temperatures admissible in producing caustic limes, with cherty limestones there is no risk of silicates being formed in an amount that would interfere with, or even prevent, the subsequent separation of the silica from the lime. This is the reason why this invention does not apply to argillaceous limestones, but to siliceous limestones which contain but small percentages of sesquioxides and are practically free from clay material, and applies particularly to those materials or deposits of limestones in which the limestone component is above 90% $CaCO_3$, and the silica component, referring to chert only, is above 95% $SiO_2$. In argillaceous limestones carrying finely divided silica, iron, and alumina, very large surfaces would be exposed to the chemical action of the lime, which action sets in, at the temperatures cogently required in the present process, as soon as quicklime is produced through calcination in any amount whatever. Also the calcium hydroxide formed by the subsequent hydration were bound to combine largely with silica, alumina, and iron.

As an example of a cherty limestone which may advantageously be treated in accordance with the invention the following analysis is given:

| | |
|---|---|
| $SiO_2$ | 35.74 |
| $R_2O_3$ | 1.34 |
| CaO | 35.26 |
| MgO | 0.30 |
| Loss on Ign. | 27.42 |

The lime material and the chert material recovered from cherty limestone analyses in the calcined state as follows:

| | Lime Material | Chert Material |
|---|---|---|
| $SiO_2$ | 8.12 | 88.71 |
| $R_2O_3$ | 1.02 | 0.45 |
| CaO | 90.10 | 9.96 |
| MgO | .27 | .94 |
| Loss on Ign. | | |

In carrying the process into practice the chert or cherty rock is crushed to sizes workable in a rotary kiln. The rock is preferably crushed to about one-half inch to one and a half inch and the undersize removed, as this increases the calcining capacity of the kiln, and enhances in the treatment of cherty limestone, the subsequent separation of the silica and calcium oxide. The process calls for a calcination temperature of ±2200° F. (1204.4° C.) as the most favorable, but will vary within reasonable limits depending on the nature and sizes of the original rocks. After calcination for a period of about one-half hour the material is chilled by cooling it rapidly with a blast of air or by sprinkling it with, or, immersing it in, water while still hot. In case of treating cherty limestones only the latter method is applicable. Under the action of water in the calcined mixture that consists of substantially pure $SiO_2$ and substantially pure CaO, the CaO converts to $Ca(OH)_2$, whereby the lumps disintegrate into a very finely divided powder, whereas the lumps of silica are not affected by this action as to their form and size. On the other hand the physical state of the silica changes from practical ungrindability to such a degree of softness that the material can easily be ground to any degree of fineness for commercial use. The coarse $SiO_2$ and fine $Ca(OH)_2$ particles are separated from each other by sifting or by mechanical classification, as with the aid of a bowl classifier, or by combining both these methods with each other. According to a preferred embodiment of the method, enough water is added to the hot calcined material to permit its continuous removal in a semi-liquid state, whereupon separation of the mixture is effected by passing it over a vibrating screen, the oversize of which is being brought in a suitable washing device for the purpose of removing adhering calcium hydroxide from the chert surfaces. The lime washed out may then be thickened in any suitable form of thickener and the thickened calcium hydroxide added to that recovered through the treatment on the vibrating screen, or reserved for separate use.

Alternatively, the calcined cherty rock is caused to drop directly in a bowl classifier, overflowing the high grade hydroxide from the bowl and removing the coarse chert by the rakes, whereupon the hydroxide is thickened in standard thickening equipment and the two products are further treated to adapt them to particular purposes.

In any case it will be recommendable to subject the washed chert to the action of acids and to wash out the so treated material with water for eliminating the remnants of acid.

It was hitherto the practice to previously calcine chert for the purpose of adding it to a major amount of saggar clay. Yet this was done without subsequent chilling or quenching and only for the purpose of lessening the tendency of the material to spall.

In addition to the advantages of the present method as set forth above, it may be mentioned that a high grade lime results therefrom which thickens relatively readily owing to the high temperatures employed in calcination. As a consequence thereof the hydroxide can easily be separated from the bulk of the water added for the purpose of hydration, and from wash water, if desired, even in repeated operations. The lime prepared in this way is pure enough for use in the manufacture of Portland cement and the like.

What is claimed is:

1. A process of beneficiating cherty minerals containing a predominant proportion of chert by weight to obtain soft high grade silica which comprises heating the material to be treated to a calcining temperature of from about 1000° C. to about 1200° C. thereby converting the silica from a state of extreme hardness to one of such softness that it can be easily ground, rapidly cooling the calcined material, and separately recovering the silica component.

2. A process according to claim 1 in which the material is cooled by immersion in water while substantially at calcination temperatures.

3. A process according to claim 1 in which the material is cooled with a gaseous chilling medium.

4. A process for producing hydrated lime and high-grade silica of such softness that it may be easily ground from substantially clay-free highly siliceous limestones containing silica in the form of chert in proportions approaching the amount of lime in the form of calcium carbonate which comprises crushing the cherty limestone to a predetermined size, removing undersize material, calcining said crushed, sized cherty limestone at a temperature of from about 1000° C. to about 1200° C., immersing the material in water while substantially at calcination temperatures to hydrate and disintegrate the lime component thereby forming fine particles of hydrated lime and to convert the silica of the chert from that having a hardness characteristic of flint to such softness that it may be easily ground while at the same time retaining the silica particles in substantially their original size, and thereafter mechanically separating the relatively coarse silica particles from the fine-hydrated lime particles.

5. A process according to claim 4 in which the limestone contains silica in the form of chert and lime in the form of carbonate in about equal parts by weight, and in which the lime and modified silica are separated by sifting.

6. A process according to claim 4 in which the limestone contains silica in the form of chert and lime in the form of carbonate in about equal parts by weight, and in which the lime and modified silica are separated by hydraulic classifications.

HAROLD J. DUNTON.

REFERENCES CITED

The following references are of record in the file of this patent:

UNITED STATES PATENTS

| Number | Name | Date |
|---|---|---|
| 1,634,424 | Hunter | July 5, 1927 |

FOREIGN PATENTS

| Number | Country | Date |
|---|---|---|
| 210,153 | Great Britain | Jan. 25, 1924 |